United States Patent [19]

Broadfield

[11] Patent Number: 5,360,683
[45] Date of Patent: Nov. 1, 1994

[54] BATTERY PACK

[75] Inventor: Gary Broadfield, East Twickenham, England

[73] Assignee: Nokia Mobile Phones Ltd., Salo, Finland

[21] Appl. No.: 149,976

[22] Filed: Nov. 10, 1993

[30] Foreign Application Priority Data

Dec. 1, 1992 [GB] United Kingdom ............. 9225127.1

[51] Int. Cl.5 ............................................. H01M 2/10
[52] U.S. Cl. ....................................... 429/99; 439/504; 361/814
[58] Field of Search ................... 429/96–100; 439/76, 500, 504; 361/380, 422; 455/90, 347

[56] References Cited

U.S. PATENT DOCUMENTS

| 4,436,792 | 3/1984 | Tomino et al. | 429/1 |
| 5,020,136 | 5/1991 | Patsiokas et al. | 455/89 |
| 5,197,889 | 3/1993 | Rizzo et al. | 439/76 |
| 5,238,431 | 8/1993 | Kreisinger | 439/733 |

FOREIGN PATENT DOCUMENTS

| 0065348A2 | 11/1982 | European Pat. Off. |
| 0488581 | 6/1992 | European Pat. Off. |
| 2114278 | 6/1972 | France |
| 2197240 | 3/1974 | France |
| 7039506.1 | 10/1970 | Germany |
| 3246968 | 7/1984 | Germany |
| 3407734 | 9/1985 | Germany |
| WO 9206513 | 4/1992 | WIPO |

OTHER PUBLICATIONS

Patent Abstracts of Japan, vol. 16, No. 453 (E-1267) Sep. 21, 1992, of JP 90-0285018 (Jun. 4, 1992).
Patent Abstracts of Japan, vol. 13, No. 226 (E-763) May 25, 1989, of JP 62-191987 (Feb. 6, 1989).

*Primary Examiner*—Anthony Skapars
*Attorney, Agent, or Firm*—Perman & Green

[57] ABSTRACT

A compact battery pack (1) for use with an electronic apparatus comprising a housing (2) having a wall portion (21) which is provided with a recess (8) to accommodate a substrate 6 having present thereon at least two electrical terminals 5 for contacting cells (4) provided in a cavity (3) within the housing. The substrate (6) is contained within the thickness of the recess (8) so that it does not extend into the cavity (3).

9 Claims, 1 Drawing Sheet

BATTERY PACK

The present invention relates to a battery pack and in particular to a battery pack for use with an electronic apparatus such as a radio telephone.

BACKGROUND OF THE INVENTION

Increasingly there is a requirement for smaller and more ergonomic electronic apparatus adapted for comfort in use and ease of storage. This has led in many cases to apparatus becoming smaller and therefore more easily handled. This has in turn led to the miniaturization of electronic components and an increased awareness of space conservation in chip and circuit board design. The hand held radio telephone is one product which has profited from such miniaturization with radio telephones today being considerably smaller than those available even a few years ago. In order to continue this trend large sums of money and considerable time have been spent in electronics research in order to produce components which provide relatively small reductions in space.

Most portable electronic apparatus such as radio telephones require a power source generally in the form of one or more cells contained within the device or a detachable battery pack.

Battery packs are generally bulky, comprising a housing enclosing the cells. Therefore, regardless of the miniaturization of the electronic components within the actual telephone, the overall telephone size will be limited at least in part by the dimensions of the battery pack.

SUMMARY OF THE INVENTION

According to the present invention there is provided a battery pack for use with an electronic apparatus, comprising a housing enclosing a plurality of cells, and a substrate having present thereon at least two electrical terminals coupled to said cells, characterized in that the housing includes a wall adapted to accommodate the substrate.

Preferably the substrate does not extend into the cavity within the housing intended to receive the plurality of cells.

A battery pack in accordance with the present invention has the advantage that it may be more compact, e.g. thinner, than previous battery packs because the pack size is now determined by cell size and wall thickness, since the substrate assembly itself now need make no contribution to the overall size of the pack. Also there is an increased freedom to position the substrate at a convenient place on any of the walls of the battery pack housing as there is no need to align it with an available space in the cavity.

Preferably the battery pack, further comprises an insulating sheet provided on the substrate, the insulating sheet having respective apertures corresponding to the electrical terminals.

The wall of the housing may comprise a first recess accommodating the substrate, and a second recess adjoining the first recess accommodating the insulating sheet.

BRIEF DESCRIPTION OF THE DRAWINGS

An embodiment of the present invention will now be described, by way of example, with reference to the accompanying drawings, in which.

DETAILED DESCRIPTION OF THE INVENTION

Figure 1:
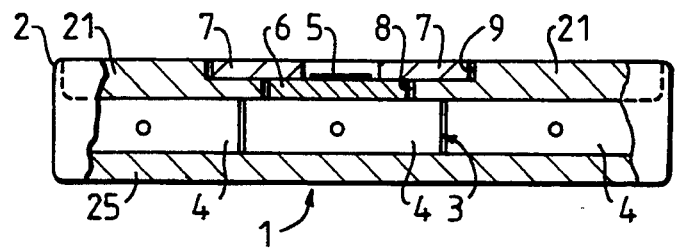
FIG. 1 is a sectional end view of a battery pack in accordance with the present invention.
Figure 2:
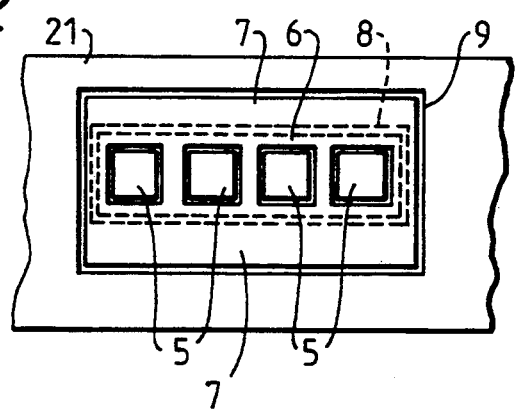
FIG. 2 is a partial plan view of a wall of the battery pack of FIG. 1.
Figure 3:
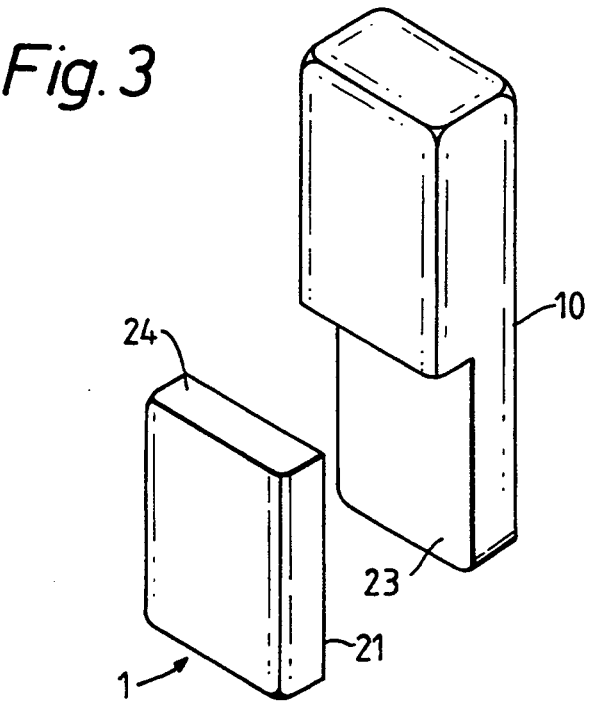
FIG. 3 is a perspective view of a radio telephone comprising a battery pack in accordance with the present invention.

FIGS. 1, 2 and 3 show a battery pack 1 for use with a radio telephone 10, the battery pack 1 comprising a two-part housing 2 suitably made of a plastics material e.g. AB5. The housing 2 comprises a flat rear wall portion 21 and a front U-shaped portion 25. The two wall portions may be fixed together, for example, with adhesive, by ultra-sonic welding or they may be snap-fitted together. A cavity 3 within said housing 2 accommodates a plurality of cells 4 and electrical contact terminals 5 provided on a substrate 6 in the form of a printed circuit board. The contact terminals 5 are coupled to the cells 4 to provide positive and negative terminals. In this example two further terminals are included for providing an identity and temperature signal. Since the purpose of these terminals is not directly relevant to the present invention no further details will be given here. The wall portion 21 of the housing 2 is adapted to accommodate the substrate 6 and contact terminals 5 so that neither the contact terminals 5 nor the substrate 6 extend within the cavity 3.

As illustrated in FIG. 1, the contact terminals 5 and substrate 6 are contained within the thickness of the wall 21 of the housing 6, thus no space within the cavity 3 is used by the substrate 6 and contact terminals 5. The wall portion 21 which is intended to abut the corresponding face 23 of the telephone 10 when in use, comprises a first recess 8 adjacent the internal cavity 3, to accommodate the substrate 6, and a second recess 9 disposed above the first recess 8, to receive an insulating sheet 7. The first and second recesses 8 and 9 form an aperture in the wall portion 21 of the housing 2. The contact terminals 5 may extend into the second recess 9, as shown.

It is noted here that the recess 9 requires only a localized thinning of the rear wall portion 21. Hence the recess 9 is manufacturable even though the main part of the wall portion 21 surrounding the recess may have a minimum thickness compatible with moulding techniques.

In this embodiment the first and second recesses are rectangular, but the shape and dimensions of the recesses may be different for different apparatus and will be determined in line with the requirements for individual apparatus.

In this embodiment the substrate 6 and contact terminals 5 may be located, in the first recess 8, anywhere on the wall portion 21 to complement the location of corresponding terminals (not shown) provided on the face 23 of the telephone 10. However, in other embodiments the recesses 8 and 9 may be located on another surface of the battery pack which mates with the telephone 10 when in use, such as the end surface 24.

The terminals 5 may be printed on the circuit board 6, which may also have other components provided thereon.

The battery pack further comprises an insulating sheet 7 provided on the substrate 6. The insulating sheet 6 has apertures corresponding to the electrical terminals 5, thus enabling electrical coupling to the terminals 5 through the insulating sheet 7. A portion of the insulating sheet 6 extends onto a wall portion of the housing surrounding the first recess 8. The sheet 7 prevents shorting of the terminals 5. The sheet 7 may be in the form of a self adhesive label, for example a polycarbonate label may be used.

The battery pack 1 as described above enables a reduction in battery pack thickness as a space need not be provided for the substrate 6 and contact terminal 5 in the cavity 3.

In view of the foregoing description, it will be clear to a person skilled in the art that modifications may be incorporated without departing from the scope of the present invention. For example, an alternative form of insulating sheet 7 may be used, or the contact terminals 5 may extend further into the recess 9 and may for example provide a contact surface flush with the wall portion 21 of the battery pack housing.

What is claimed is:

1. A battery pack for use with an electronic apparatus, comprising a housing enclosing a plurality of cells, and a substrate having present thereon at least two electrical terminals coupled to said cells;
    characterized in that the housing includes a wall comprising a recess adapted to accommodate the substrate.

2. A battery pack as claimed in claim 1, wherein the wall of the housing is adapted to accommodate the substrate and the electrical terminals.

3. A battery pack as claimed in claim 2, wherein the substrate is disposed substantially within the thickness of the wall.

4. A battery pack as claimed in claim 1, further comprising an insulating sheet provided on the substrate, the insulating sheet having respective apertures corresponding to the electrical terminals.

5. A battery pack as claimed in claim 4, wherein the wall of the housing comprises a first recess, accommodating the substrate, and a second recess adjoining the first recess accommodating the insulating sheet.

6. A battery pack as claimed in claim 5, wherein the insulating sheet extends onto a wall portion of the housing surrounding the first recess.

7. A battery pack as claimed in claim 5, wherein the first and second recesses together form an aperture extending through said wall.

8. A battery pack as claimed in claim 1, wherein said wall of the housing confronts the apparatus when the battery pack is used with said apparatus.

9. In a radio telephone having a housing and a removable battery pack, the battery pack having a battery pack housing enclosing a plurality of cells, the improvement comprising:
    the battery pack having a substrate with at least two electrical terminals coupled to the cells and, the battery pack housing having a wall comprising a recess suitably sized and shaped to accommodate the substrate in the wall.

* * * * *